US012653160B2

(12) United States Patent
Qiu

(10) Patent No.: US 12,653,160 B2
(45) Date of Patent: Jun. 16, 2026

(54) ANTI-LUNGE LEASH DEVICE

(71) Applicant: JIANGSU ZHONGHENG PET ARTICLES JOINT-STOCK CO., LTD., Jiangsu (CN)

(72) Inventor: Bin Qiu, Jiangsu (CN)

(73) Assignee: JIANGSU ZHONGHENG PET ARTICLES JOINT-STOCK CO., LTD., Jiangsu (CN)

( * ) Notice: Subject to any disclaimer, the term of this patent is extended or adjusted under 35 U.S.C. 154(b) by 141 days.

(21) Appl. No.: 18/796,254

(22) Filed: Aug. 6, 2024

(65) Prior Publication Data

US 2025/0228214 A1      Jul. 17, 2025

(30) Foreign Application Priority Data

Jan. 12, 2024    (CN) ......................... 202420080651.5

(51) Int. Cl.
*A01K 27/00*              (2006.01)
(52) U.S. Cl.
CPC .......... *A01K 27/004* (2013.01); *A01K 27/005* (2013.01)
(58) Field of Classification Search
CPC .. A01K 27/004; A01K 27/005; A01K 27/003; A01K 27/008; B65H 75/4431; B65H 2701/35; B65H 75/4436; B65H 75/406
See application file for complete search history.

(56) References Cited

U.S. PATENT DOCUMENTS

| | | | | | |
|---|---|---|---|---|---|
| 5,377,626 | A | * | 1/1995 | Kilsby | ................. A01K 27/004 119/796 |
| 6,904,872 | B2 | * | 6/2005 | Muller | ................. A01K 27/004 119/796 |
| 8,251,020 | B2 | * | 8/2012 | Matthews | ............ A01K 27/004 242/396.5 |
| 9,104,226 | B2 | * | 8/2015 | Shi | ........................... G05G 1/04 |
| 9,339,014 | B1 | * | 5/2016 | Wettermann | ......... A01K 27/004 |
| 2005/0103282 | A1 | * | 5/2005 | Huff | ..................... A01K 27/004 119/796 |
| 2007/0131177 | A1 | * | 6/2007 | Perkitny | .............. A01K 27/004 119/796 |
| 2011/0180017 | A1 | * | 7/2011 | Goldenberg | ......... A01K 27/004 119/796 |
| 2014/0174377 | A1 | * | 6/2014 | Geller | .................. A01K 27/004 119/796 |
| 2014/0238314 | A1 | * | 8/2014 | O'Brien | ............... A01K 27/004 119/796 |

* cited by examiner

*Primary Examiner* — Trinh T Nguyen
(74) *Attorney, Agent, or Firm* — JCIPRNET

(57) ABSTRACT

An anti-lunge leash device includes a base, an upper shell detachably connected to the base, a reel, a leash wound in an annular groove of the reel, a locking tongue and a leash extractor. First and second rotating shafts are arranged on an end surface of the base. The reel is arranged around the first rotating shaft. At least one tooth is arranged on the reel. The leash extractor is detachably connected to an edge of the end surface of the base. A notch matching the leash extractor is provided on the upper shell. The locking tongue is arranged around the second rotating shaft. A twisted surface is provided on a side of the locking tongue and fits to the leash. An engaging groove is provided on a side of the locking tongue adjacent to the reel. An edge of the engaging groove and the teeth form a clutch structure.

9 Claims, 4 Drawing Sheets

ANTI-LUNGE LEASH DEVICE

CROSS-REFERENCE TO RELATED APPLICATION

This application claims the priority benefit of China application serial no. 202420080651.5, filed on Jan. 12, 2024. The entirety of the above-mentioned patent application is hereby incorporated by reference herein and made a part of this specification.

BACKGROUND

Technical Field

The present disclosure relates to the technical field of pet products, and specifically to an anti-lunge leash device.

Description of Related Art

Pets are friendly friends of human beings, and more and more people begin to keep pets. Taking pets out is a necessary activity for keeping pets. Keeping pets on a leash when outside is of great significance to the safety of other people and pets. When taking a pet out for activities, it is necessary to ensure that the pet has a large range of movement and that the keeper can control the range of movement in a timely manner. Accordingly, a telescopic leash with a locking function has been devised, which not only ensures that the pet has a large range of movement, but also ensures that the keeper can control the range of movement of the pet. However, the pet may lunge and pull on the leash, which is unpredictable and occurs in a sudden. If the leash is not locked, the pet can lunge very fast, and the keeper does not have enough time to react and cannot control the range of movement of the pet in a timely manner, posing safety risks.

SUMMARY

An anti-lunge leash device includes a base, an upper shell, a reel, a leash, a locking tongue, a first baffle plate, a second baffle plate, and a leash extractor, wherein a first rotating shaft is arranged on an end surface of the base, the reel is arranged around the first rotating shaft, and at least one tooth is arranged on each of two sides of the reel;

the leash is wound in an annular groove on a side wall of the reel;

the leash extractor is detachably connected to an edge of the end surface of the base to guide the leash to extend out of the upper shell;

the upper shell is detachably connected to the base, and a notch matching the leash extractor is provided on a side wall of the upper shell;

a second rotating shaft is arranged on the end surface of the base, the locking tongue is arranged around the second rotating shaft, a twisted surface is provided on a side of the locking tongue adjacent to the leash, and the twisted surface fits to the leash;

an engaging groove is provided on a side of the locking tongue adjacent to the reel, and an edge of an opening of the engaging groove and the at least one tooth on each of the two sides of the reel form a clutch structure;

the first baffle plate and the second baffle plate are arranged on the end surface of the base, and an elastic assembly is arranged at a bottom of the locking tongue to press the locking tongue against a side surface of the first baffle plate; and when the edge of the opening of the engaging groove is engaged with the at least one tooth on each of the two sides of the reel, the side of the locking tongue provided with the twisted surface is pressed against a side surface of the second baffle plate.

Preferably, the elastic assembly includes an assembly hole and a torsion spring; the assembly hole is provided at the bottom of the locking tongue;

the torsion spring is arranged in the assembly hole and is sleeved around the second rotating shaft; and a first end of the torsion spring is connected to an inner wall of the assembly hole, and a second end of the torsion spring extends out of the assembly hole and is connected to the base.

Preferably, a sink is provided on a top surface of the reel, a coil spring is arranged in the sink, a first end of the coil spring is detachably connected to the first rotating shaft, a second end of the coil spring is detachably connected to a mounting plate, and the mounting plate is arranged in the sink.

Preferably, an end cover is detachably connected at an opening of the sink, and a top of the end cover is rotatably connected to an inner wall of the upper shell.

Preferably, a slot is provided on the leash extractor, and the slot is arranged parallel to the base.

Preferably, a fixing pin is detachably connected in the annular groove on the side wall of the reel, and the fixing pin is connected to one end of the leash.

Preferably, the anti-lunge leash device further includes a manual lock, where the manual lock is arranged on the upper shell, the manual lock includes a cover plate and a locking block, the cover plate is detachably connected to an inner wall of the upper shell, and the locking block is slidably connected to an end surface of the cover plate;

an engaging block and a toggle block are respectively arranged on two sides of the locking block;

a first through hole is provided on the cover plate, and an end of the engaging block extends through the first through hole and forms a clutch structure with the at least one tooth on one side of the reel; and a second through hole is provided on the upper shell, and an end of the toggle block extends out of the upper shell through the second through hole.

Preferably, a buffer is arranged at an end of the leash extending out of the upper shell.

Preferably, a soft rubber casing is detachably connected to the upper shell, clearance slots are provided on the soft rubber casing, and the clearance slots are configured to allow the leash extractor and the toggle block to respectively extend out.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
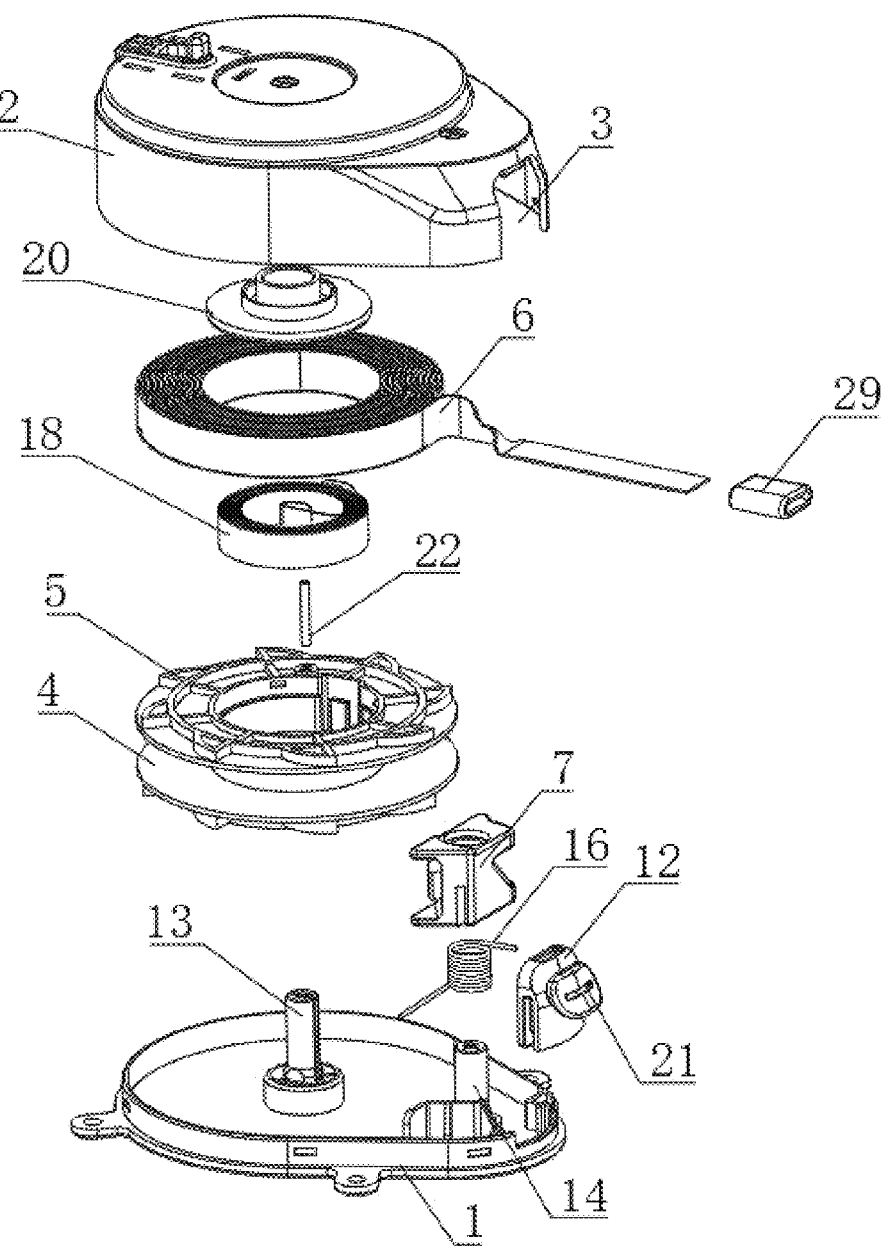
FIG. 1 is an exploded view of an anti-lunge leash device according to the present disclosure.

In the following description, numerous specific details are given to provide a more thorough understanding of the present disclosure. However, it will be apparent to those skilled in the art that the present disclosure can be practiced without one or more of these details. In some other examples, to avoid confusion with the present disclosure, some technical features well known in the art are not described.

Embodiment 1

As shown in FIG. 1 to FIG. 4, an anti-lunge leash device disclosed in this embodiment includes a base 1, an upper shell 2, a reel 4, a leash 6, a locking tongue 7, a first baffle plate 10, a second baffle plate 11, and a leash extractor 12. A first rotating shaft 13 is arranged on an end surface of the base 1. The reel 4 is arranged around the first rotating shaft 13. At least one tooth 5 is arranged on each of two sides of the reel 4. The leash 6 is wound in an annular groove on a side wall of the reel 4. The leash extractor 12 is detachably connected to an edge of the end surface of the base 1 to guide the leash 6 to extend out of the upper shell 2. The upper shell 2 is detachably connected to the base 1. A notch 3 matching the leash extractor 12 is provided on a side wall of the upper shell 2. A second rotating shaft 14 is arranged on the end surface of the base 1. The locking tongue 7 is arranged around the second rotating shaft 14. A twisted surface 8 is provided on a side of the locking tongue 7 close to the leash 6. The twisted surface 8 fits to the leash 6. An engaging groove 9 is provided on a side of the locking tongue 7 adjacent to the reel 4. An edge of an opening of the engaging groove 9 and the teeth 5 on the two sides of the reel 4 form a clutch structure. The first baffle plate 10 and the second baffle plate 11 are arranged on the end surface of the base 1. An elastic assembly is arranged at a bottom of the locking tongue 7 to press the locking tongue 7 against a side surface of the first baffle plate 10. When the edge of the opening of the engaging groove 9 is engaged with the teeth 5 on the two sides of the reel 4, the side of the locking tongue 7 provided with the twisted surface 8 is pressed against a side surface of the second baffle plate 11. When the pet lunges, the leash 6 is pulled out of the upper shell 2 quickly, and an inclined downward pulling force is generated. Because the leash 6 fits to the twisted surface 8 on the locking tongue 7, the pulling force acts on the locking tongue 7. The direction of the pulling force is opposite to the direction of the torque of the elastic assembly and the pulling force is greater than the torque force of the elastic assembly, forcing the locking tongue 7 to rotate toward the reel 4, i.e., driving the edge of the opening of the engaging groove 9 to engage with the teeth 5 on the two sides of the reel 4, thus automatically locking the reel 4. In this way, the range of movement of the pet can be controlled in a timely manner, to prevent safety risks when the pet lunges.

Figure 2:
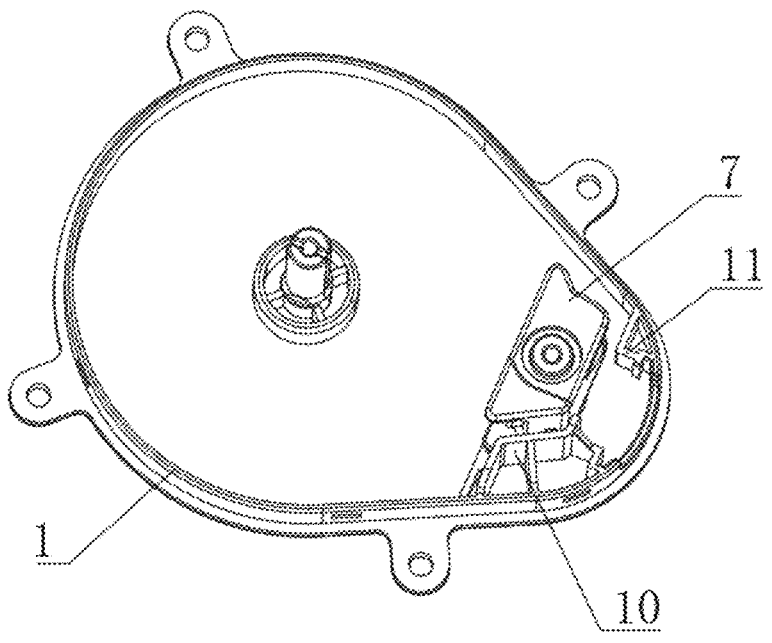
FIG. 2 is a schematic view of a base of an anti-lunge leash device according to the present disclosure.
Figure 4:
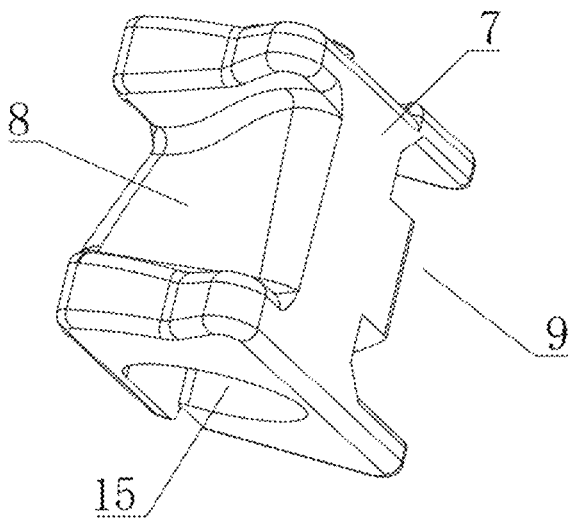
FIG. 4 is a partial exploded view of an anti-lunge leash device according to the present disclosure.
Figure 5:
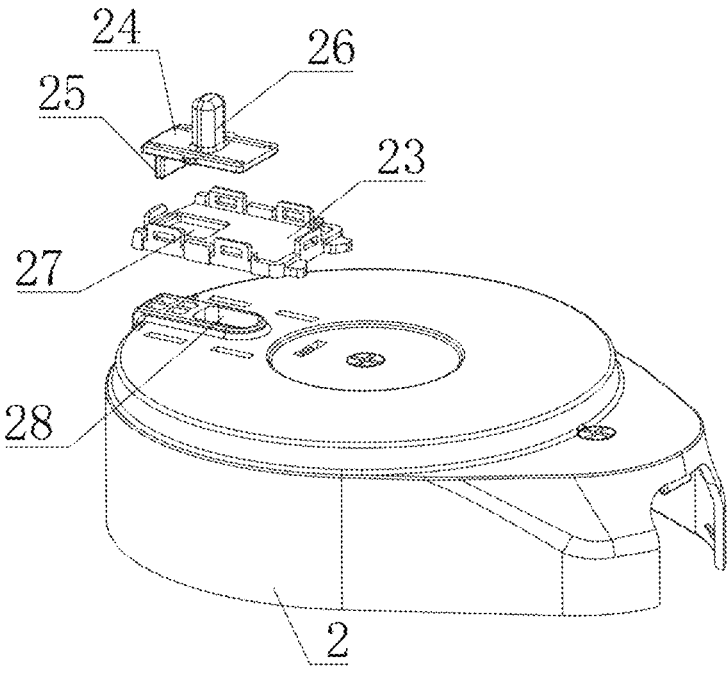
FIG. 5 is a schematic view of a locking tongue of an anti-lunge leash device according to the present disclosure.
Figure 6:
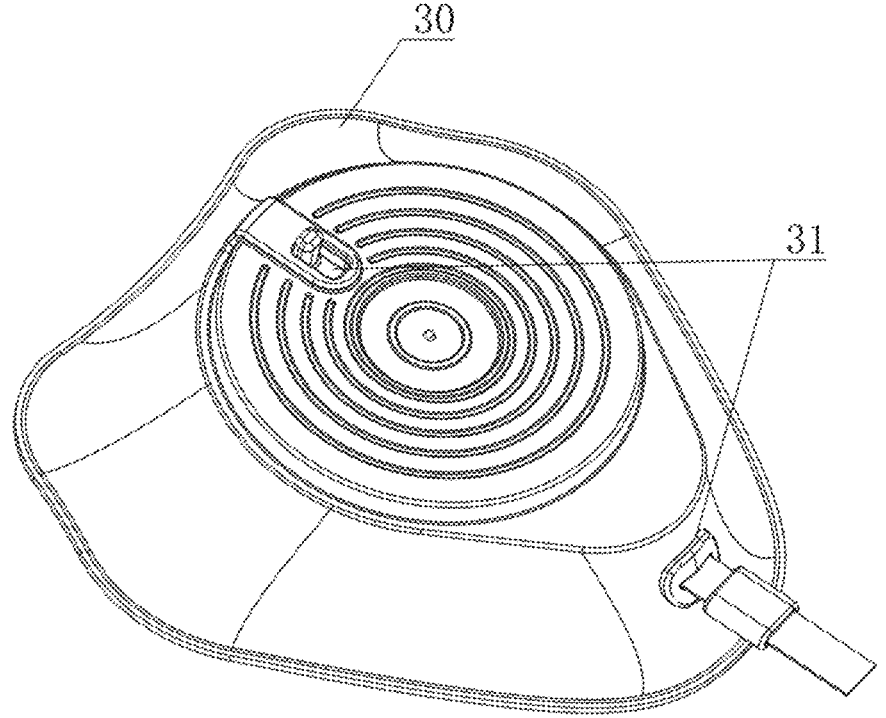
FIG. 6 is a schematic view of a soft rubber casing of an anti-lunge leash device according to the present disclosure.

As shown in FIG. 2 and FIG. 4, the elastic assembly includes an assembly hole 15 and a torsion spring 16. The assembly hole 15 is provided at the bottom of the locking tongue 7. The torsion spring 16 is arranged in the assembly hole 15 and is sleeved over the second rotating shaft 14. A first end of the torsion spring 16 is connected to an inner wall of the assembly hole 15, and a second end of the torsion spring 16 extends out of the assembly hole 15 and is connected to the base 1, to press the locking tongue 7 against a side surface of the first baffle plate 10. The locking tongue 7 and the reel 4 do not contact each other when the leash device is in normal use.

As shown in FIG. 1 and FIG. 2, a sink 17 is provided on a top surface of the reel 4. A coil spring 18 is arranged in the sink 17. A first end of the coil spring 18 is detachably connected to the first rotating shaft 13, and a second end of the coil spring 18 is detachably connected to a mounting plate 19. The mounting plate 19 is arranged in the sink 17. An elastic restoring force of the coil spring 18 drives the reel 4 to rotate, thus automatically reeling back the leash 6.

As shown in FIG. 1, an end cover 20 is detachably connected at an opening of the sink 17, and a top of the end cover 20 is rotatably connected to an inner wall of the upper shell 2. The end cover 20 presses against the coil spring 18 to prevent the coil spring 18 from shaking and affecting the normal use of the leash device.

As shown in FIG. 2, a slot 21 is provided on the leash extractor 12, and the slot 21 is arranged parallel to the base 1. The leash 6 is twisted a predetermined angle through the twisted surface 8 on the locking tongue 7, and then twisted a predetermined angle again through the slot 21, so that the leash 6 is in a flat state when extending out of the upper shell 2, to prevent entanglement of the leash 6 and improve the flatness of the leash 6 during reeling and unreeling.

As shown in FIG. 1, a fixing pin 22 is detachably connected in the annular groove on the side wall of the reel 4, and the fixing pin 22 is connected to one end of the leash 6, to fix the end of the leash 6.

Embodiment 2

Figure 3:
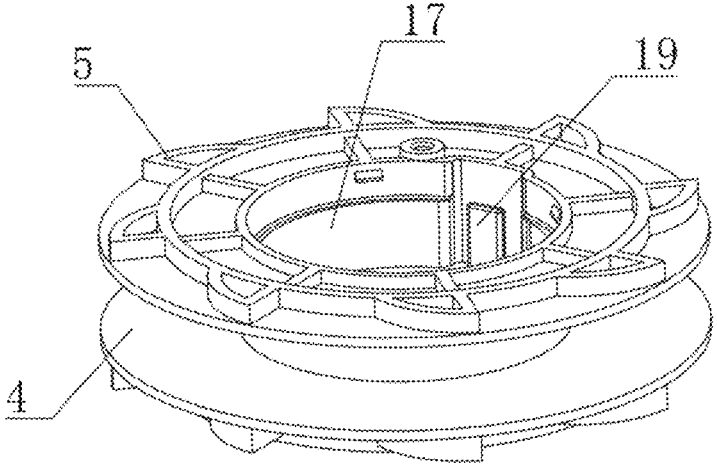
FIG. 3 is a schematic view of a reel of an anti-lunge leash device according to the present disclosure.

As shown in FIG. 3, different from Embodiment 1, an anti-lunge leash device disclosed in this embodiment further includes a manual lock. The manual lock is arranged on the upper shell 2. The manual lock includes a cover plate 23 and a locking block 24. The cover plate 23 is detachably connected to an inner wall of the upper shell 2. The locking block 24 is slidably connected to an end surface of the cover plate 23. An engaging block 25 and a toggle block 26 are respectively arranged on two sides of the locking block 24. A first through hole 27 is provided on the cover plate 23. An end of the engaging block 25 extends through the first through hole 27 and forms a clutch structure with the teeth 5 on one side of the reel 4. A second through hole 28 is provided on the upper shell 2. An end of the toggle block 26 extends out of the upper shell 2 through the second through hole 28. The toggle block 26 is pulled to drive the locking block 24 to move, to allow the engaging block 25 to engage with the teeth 5 on one side of the reel 4, so that the reel 4 can be locked. Whereby, the functionality of the leash device is improved.

Embodiment 3

As shown in FIG. 1, different from Embodiment 1, in an anti-lunge leash device leash disclosed in this embodiment, a buffer 29 is arranged at another end of the leash 6 extending out of the upper shell 2. When the leash 6 is reeled back, the leash extractor 12 is separated from a fastener connected at the other end of the leash 6 by the buffer 29 to prevent the fastener from colliding with the leash extractor 12, thereby protecting the leash extractor 12.

Embodiment 4

As shown in FIG. 1, different from Embodiment 1, in an anti-lunge leash device leash disclosed in this embodiment, a soft rubber casing 30 is detachably connected to the upper shell 2, and clearance slots 31 are provided on the soft rubber casing 30. The clearance slots 31 are configured to allow the leash extractor 12 and the toggle block 26 to respectively extend out. The soft rubber casing 30 improves aesthetics of the leash device and protects the upper shell 2.

The present disclosure has the following advantages.

1. When the pet lunges, the leash is pulled out of the upper shell quickly, and an inclined downward pulling force is generated. Because the leash fits to the twisted surface on the locking tongue, the pulling force acts on the locking tongue. The direction of the pulling force is opposite to the direction of the torque of the elastic assembly and the pulling force is greater than the torque force of the elastic assembly, forcing the locking tongue to rotate toward the reel, i.e., driving the edge of the opening of the engaging groove to engage with the teeth on the two sides of the reel, thus automatically locking the reel. In this way, the range of movement of the pet can be controlled in a timely manner, to prevent safety risks when the pet lunges.

2. The leash is twisted a predetermined angle through the twisted surface on the locking tongue, and then twisted a predetermined angle again through the slot, so that the leash is in a flat state when extending out of the upper shell, to prevent entanglement of the leash and improve the flatness of the leash during reeling and unreeling.

3. The toggle block is pulled to drive the locking block to move, to allow the engaging block to engage with the teeth on one side of the reel, so that the reel can be locked. Whereby, the functionality of the leash device is improved.

4. When the leash is reeled back, the leash extractor is separated from a fastener connected at an end of the leash by the buffer to prevent the fastener from colliding with the leash extractor, thereby protecting the leash extractor.

Preferred embodiments of the present disclosure have been described in detail above in conjunction with the accompanying drawings, but the present disclosure is not limited to the specific details in the above embodiments. Various equivalent modifications can be made to the technical solutions of the present disclosure without departing from the scope of the technical concept of the present disclosure. Such equivalent modifications shall all fall within the protection scope of the present disclosure.

What is claimed is:

1. An anti-lunge leash device, comprising a base, an upper shell, a reel, a leash, a locking tongue, a first baffle plate, a second baffle plate, and a leash extractor, wherein
a first rotating shaft is arranged on an end surface of the base, the reel is arranged around the first rotating shaft, and at least one tooth is arranged on each of two sides of the reel;
the leash is wound in an annular groove on a side wall of the reel;
the leash extractor is detachably connected to an edge of the end surface of the base to guide the leash to extend out of the upper shell;
the upper shell is detachably connected to the base, and a notch matching the leash extractor is provided on a side wall of the upper shell;

a second rotating shaft is arranged on the end surface of the base, the locking tongue is arranged around the second rotating shaft, a twisted surface is provided on a side of the locking tongue adjacent to the leash, and the twisted surface fits to the leash;
an engaging groove is provided on a side of the locking tongue adjacent to the reel, and an edge of an opening of the engaging groove and the at least one tooth on each of the two sides of the reel form a clutch structure;
the first baffle plate and the second baffle plate are arranged on the end surface of the base, and an elastic assembly is arranged at a bottom of the locking tongue to press the locking tongue against a side surface of the first baffle plate; and
when the edge of the opening of the engaging groove is engaged with the at least one tooth on each of the two sides of the reel, the side of the locking tongue provided with the twisted surface is pressed against a side surface of the second baffle plate.

2. The anti-lunge leash device according to claim 1, wherein the elastic assembly comprises an assembly hole and a torsion spring; the assembly hole) is provided at the bottom of the locking tongue;
the torsion spring is arranged in the assembly hole and is sleeved around the second rotating shaft; and
a first end of the torsion spring is connected to an inner wall of the assembly hole, and a second end of the torsion spring extends out of the assembly hole and is connected to the base.

3. The anti-lunge leash device according to claim 1, wherein a sink is provided on a top surface of the reel, a coil spring is arranged in the sink, a first end of the coil spring is detachably connected to the first rotating shaft, a second end of the coil spring is detachably connected to a mounting plate, and the mounting plate is arranged in the sink.

4. The anti-lunge leash device according to claim 3, wherein an end cover is detachably connected at an opening of the sink, and a top of the end cover is rotatably connected to an inner wall of the upper shell.

5. The anti-lunge leash device according to claim 1, wherein a slot is provided on the leash extractor, and the slot is arranged parallel to the base.

6. The anti-lunge leash device according to claim 1, wherein a fixing pin is detachably connected in the annular groove on the side wall of the reel, and the fixing pin is connected to one end of the leash.

7. The anti-lunge leash device according to claim 1, further comprising a manual lock, wherein the manual lock is arranged on the upper shell, the manual lock comprises a cover plate and a locking block, the cover plate is detachably connected to an inner wall of the upper shell, and the locking block is slidably connected to an end surface of the cover plate;
an engaging block and a toggle block are respectively arranged on two sides of the locking block;
a first through hole is provided on the cover plate, and an end of the engaging block extends through the first through hole and forms a clutch structure with the at least one tooth on one side of the reel; and
a second through hole is provided on the upper shell, and an end of the toggle block extends out of the upper shell through the second through hole.

8. The anti-lunge leash device according to claim 1, wherein a buffer is arranged at one end of the leash extending out of the upper shell.

9. The anti-lunge leash device according to claim 7, wherein a soft rubber casing is detachably connected to the upper shell, clearance slots are provided on the soft rubber casing, and the clearance slots are configured to allow the leash extractor and the toggle block to respectively extend out.

\* \* \* \* \*